(12) United States Patent
Bartolome et al.

(10) Patent No.: US 12,568,431 B2
(45) Date of Patent: Mar. 3, 2026

(54) ON DEMAND NETWORK SLICING

(71) Applicant: HEWLETT PACKARD ENTERPRISE DEVELOPMENT LP, Spring, TX (US)

(72) Inventors: Jose Ignacio Blazquez Bartolome, Spring, TX (US); Wei Shen, Plano, TX (US)

(73) Assignee: HCL TECHNOLOGIES LIMITED (IN)

( * ) Notice: Subject to any disclaimer, the term of this patent is extended or adjusted under 35 U.S.C. 154(b) by 569 days.

(21) Appl. No.: 18/159,931

(22) Filed: Jan. 26, 2023

(65) Prior Publication Data

US 2024/0259929 A1 Aug. 1, 2024

(51) Int. Cl.

| | |
|---|---|
| *H04W 48/18* | (2009.01) |
| *H04W 4/50* | (2018.01) |
| *H04W 48/16* | (2009.01) |

(52) U.S. Cl.
CPC ............. *H04W 48/18* (2013.01); *H04W 4/50* (2018.02); *H04W 48/16* (2013.01)

(58) Field of Classification Search
CPC ........ H04W 48/18; H04W 4/50; H04W 48/16
See application file for complete search history.

(56) References Cited

U.S. PATENT DOCUMENTS

| | | | | |
|---|---|---|---|---|
| 11,026,060 | B2 | 6/2021 | Gage | |
| 11,310,641 | B2 * | 4/2022 | Sicard | ................... H04W 8/245 |
| 11,729,137 | B2 * | 8/2023 | Lee | ...................... H04L 61/4541 |
| | | | | 709/245 |
| 2021/0392557 | A1 | 12/2021 | Mallikarjunan et al. | |
| 2021/0392572 | A1 | 12/2021 | Thantharate et al. | |
| 2022/0225061 | A1 * | 7/2022 | Kim | ......................... H04W 4/50 |
| 2023/0026417 | A1 * | 1/2023 | Thantharate | ....... H04W 36/0016 |
| 2023/0262588 | A1 * | 8/2023 | Gao | ....................... H04W 48/12 |
| | | | | 370/331 |
| 2023/0422293 | A1 * | 12/2023 | Qiao | ........................ H04W 8/26 |
| 2024/0259929 | A1 * | 8/2024 | Bartolome | .............. H04W 4/50 |
| 2025/0219923 | A1 * | 7/2025 | Xu | ....................... H04L 43/0876 |

OTHER PUBLICATIONS

3rd Generation Partnership Project; Technical Specification Group Services and System Aspects; System architecture for the 5G System (5GS); Stage 2, Jun. 2022, 568 Pgs.
GSMA, "Service Entitlement Configuration", Version 8.0 , Jan. 28, 2022, 122 pages.
Chang et al., "RAN Runtime Slicing System for Flexible and Dynamic Service Execution Environment", IEEE, 2018, 25 pages.

\* cited by examiner

*Primary Examiner* — Julio R Perez
(74) *Attorney, Agent, or Firm* — Brooks Kushman P.C.

(57) ABSTRACT

Network slicing is a feature and architecture in a 5G Standalone (SA) network. Permitting a device to request a network slice that has not already been pre-configured into the device will allow for the utilization of network slices that may have more suitable characteristics based on the particular needs of the device. Systems and methods are provided for on demand 5G slicing that allow a device to interact with the 5G network to request a particular slice based on characteristics, such as speed, latency, and reliability, in order to fulfill the particular needs of the device and obtain the best user experience. In some examples, an Entitlement Configuration Server (ECS) is used as the point of communication between a device and the 5G network.

20 Claims, 5 Drawing Sheets

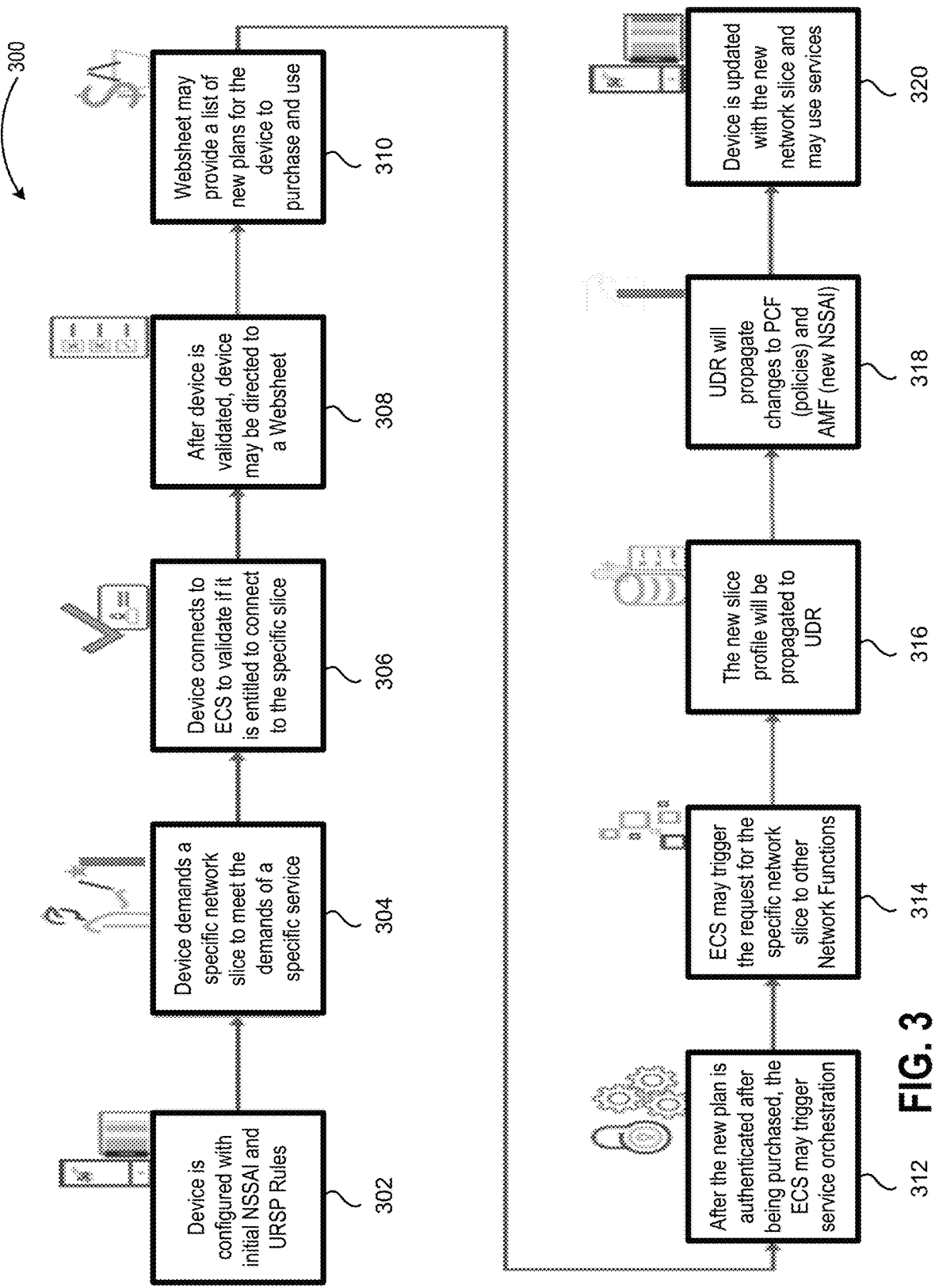

300

302 — Device is configured with initial NSSAI and URSP Rules

304 — Device demands a specific network slice to meet the demands of a specific service 306 — Device connects to ECS to validate if it is entitled to connect to the specific slice 308 — After device is validated, device may be directed to a Websheet 310 — Websheet may provide a list of new plans for the device to purchase and use 312 — After the new plan is authenticated after being purchased, the ECS may trigger service orchestration 314 — ECS may trigger the request for the specific network slice to other Network Functions 316 — The new slice profile will be propagated to UDR 318 — UDR will propagate changes to PCF (policies) and AMF (new NSSAI)

320 — Device is updated with the new network slice and may use services

FIG. 3

COMPUTING COMPONENT <u>400</u>

HARDWARE PROCESSOR <u>402</u>

MACHINE-READABLE STORAGE MEDIUM <u>404</u>

RECEIVE, FROM A DEVICE, A REQUEST TO CONNECT TO A NETWORK SLICE IN A COMMUNICATIONS NETWORK
<u>406</u>

OBTAIN, FROM THE REQUEST, NETWORK SPECIFICATIONS ASSOCIATED WITH REQUIREMENTS OF THE NETWORK DEVICE BEING REQUESTED BY THE DEVICE
<u>408</u>

DETERMINE, BASED ON THE NETWORK SPECIFICATIONS, A FIRST NETWORK SLICE IN THE COMMUNICATIONS NETWORK FOR THE DEVICE TO CONNECT TO
<u>410</u>

ASSIGN THE FIRST NETWORK SLICE TO THE DEVICE BY ACTIVATING THE FIRST NETWORK SLICE IN THE COMMUNICATIONS NETWORK, CREATING A COMMUNICATIONS NETWORK PLAN FOR A CONNECTION BETWEEN THE FIRST NETWORK SLICE AND THE DEVICE, AND SENDING, TO THE DEVICE, FIRST NETWORK SLICE CONFIGURATIONS FOR THE DEVICE TO INCORPORATE
<u>412</u>

FIG. 4

ON DEMAND NETWORK SLICING

BACKGROUND

Wireless devices (e.g., smart phones, tablets, and laptops) are used to send and receive data. Such data may be transmitted and received over a wireless network. Wireless networks may be operated in accordance with various communications standards. 5G is one such standard promulgated by the International Telecommunication Union (ITU) and the 3$^{rd}$ Generation Partnership Project (3GPP), with the ITU setting the minimum requirements for 5G compliance, and the 3GPP creating the corresponding specifications. 5G is a successor to the 4G/Long Term Evolution (LTE) standard, and refers to the fifth generation of wireless broadband technology for digital cellular networks. 5G is intended to replace or augment 4G/LTE. Touted advantages of 5G include, e.g., exponentially faster data download and upload speeds, along with much-reduced latency (also referred to as "air latency," e.g., the time it takes for a device to communicate with the network). Another advantage of 5G is the introduction of network slicing, which can refer to the ability to create/operate multiple virtual networks, each designed/dedicated to a specific use case, for example.

Network slicing is an important capability to bring network resource utilization efficiency, deployment flexibility and support fast growing over the top (OTT) application and services. Network slicing is a key feature and architecture in a 5G Standalone (SA) network. Every single 5G connection contains a slice. Telco operators utilize network slicing by provisioning, configuring and assigning a slice when a 5G connection is established.

BRIEF DESCRIPTION OF THE DRAWINGS

The present disclosure, in accordance with one or more various examples, is described in detail with reference to the following figures. The figures are provided for purposes of illustration only and merely depict typical or example examples.

FIG. 3 illustrates an example flowchart for effectuating on demand network slicing in accordance with one example.

FIG. 4 is an example computing component that may be used to implement various features of on demand network slicing in accordance with one example of the disclosed technology.

Figure 1:
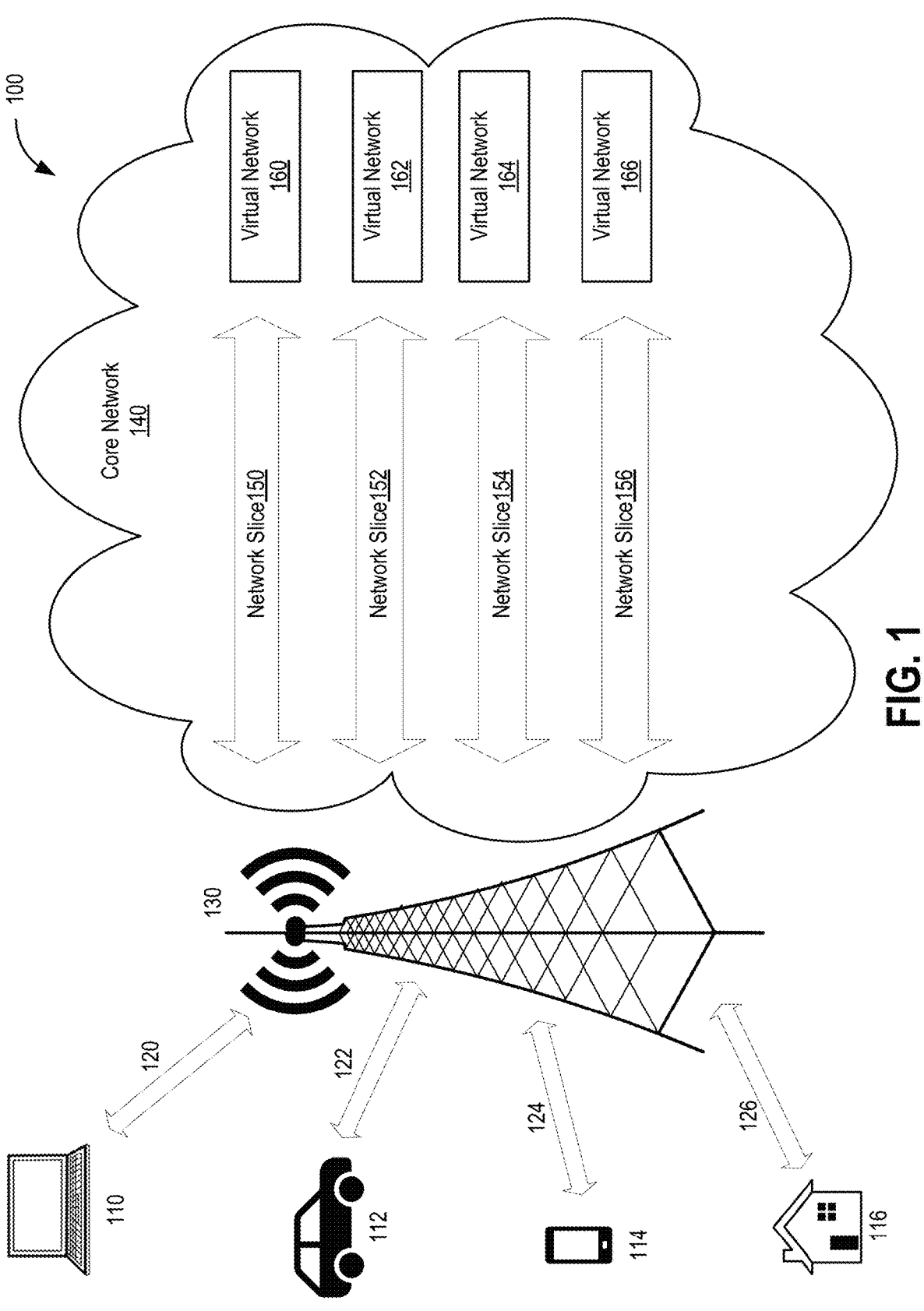
FIG. 1 illustrates an example network in which network slicing is implemented.

The figures are not exhaustive and do not limit the present disclosure to the precise form disclosed.

DETAILED DESCRIPTION

As alluded to above, the 5G standard introduces the concept of network slicing, which refers to the ability to create and operate multiple virtual networks, with each virtual network or network slice dedicated to a specific use case. Accordingly, a 5G network can include multiple parallel virtual networks, each supporting a particular use case or delivering services to a subset of devices. Examples of devices can include, e.g., smart meters, connected vehicles, smart phones, industrial equipment, and/or any device capable of accessing a network.

Currently, network slicing is utilized by a network when the Network Slice Selection Assistance Information (NSSAIs) of a device is sent to the network, and the network uses the NSSAI to select a particular network slice for the device to use. However, there currently is no way for a user of a device to request to connect the device to a specific network slice that has not already been selected and configured in the device. Permitting a user to request to connect the device to a specific slice will allow users to utilize network slices with characteristics that are more suitable for the particular demands of the user, allowing the user to obtain the best user experience. Carriers may also monetize on-demand network slicing since a user will likely be more willing to pay for a specific service that he/she is requesting for in order to fit their particular needs.

For network security and other operational reasons, the business customer or tenant of a network slice instance may wish to set forth policies which specify that only a particular type of device or only certain devices can connect to and use the network resources and services associated with that slice, and those policies should be applied by the network when a device requests access to that slice. For example, in a manufacturing environment, a policy may enable access of industrial equipment in a particular area of operation to a network slice configured for monitoring/controlling that manufacturing area of operation.

Each device or user equipment (UE) can be identified by certain identification information, e.g., its International Mobile Equipment Identity (IMEI), or its Permanent Equipment Identification (PEI), the 5G equivalent to the IMEI. A UE may also be identified and have functions according to the subscriber that is associated with the device. A subscriber may have its own profile and characteristics that may provide allow an associated UE to connect to and use certain network slices. Currently, the 5G standard specifies checking a subscriber's authority to access a slice vis-à-vis that subscriber's corresponding subscriber profile. An Equipment Identity Register (EIR), used to check UE status is typically implemented as a centralized database within a network. The EIR is currently used to identify potentially stolen devices/prevent unauthorized devices from accessing a network via a deny list (also commonly referred to as a "blacklist") containing prohibited IMEIs.

Another departure from previous standards, e.g., 4G, is the decomposition of the 4G Mobility Management Entity (MME) into what in 5G, is referred to as the 5G Core Access and Mobility Management Function (AMF). The AMF may receive connection and mobility management tasks from UEs, and can handle connection and mobility management tasks, while forwarding session management tasks/messages to a Session Management Function (SMF).

Although a 5G-specific EIR and AMF have been introduced, current systems are not able to address on-demand network slicing that allows a device to request for a network slice based on particular network requirements, such as speed, latency, and reliability, that the device demands, and control the access to the network slice that meets the device's network requirements based on the user's demands when the device is not preconfigured with access to that particular network slice. This invention discloses the mechanism of on demand network slicing which is performed through an Entitlement Configuration Server (ECS), which acts as the single entry point for the communication between a device and a communication network, including, for example, a 5G network or a 4G network. Upon receipt of a request from a device for a network slice with particular network requirements, the ECS may analyze information sent by the device about the network requirements and interact with other Network Functions (NFs) to assign the device to the network slice that meets the device's request according to the availability of the network and the subscription of the device. The ECS may also expose the available slices to be selected by the user who sent a request for a network slice. In some examples, slices may be available according to the subscriber associated with the device. Slices may also be available for a user to purchase and a user may purchase an available slice using a Websheet. A slice may be available to purchase if the device has the configurations to access the slice and the device does not already have access to the slice. Available slices may also be provided directly to a device, where the user of the device may choose which of the slices it wants to use and/or purchase. Slices may be available according to the subscriber associated with the device sending the request. Slices may also be available that may have been purchased by the user of the device. Slices that are selected and/or purchased may be sent to the device using the standard process through the AMF.

Accordingly, various examples are directed to an ECS NF that is used for communications between a device and a network to: (1) receive requests for network slices; (2) obtain network requirements of the device; (3) determine the appropriate network slice to assign to the device according to the network requirements; and (4) assign the network slice to the device. The ECS can sync with other various NFs, such as the AMF, the Policy Control Function (PCF), and the Charging Function (CHF), to determine the network slice to assign to the device according to the network requirements. Although network slicing was introduced in the 5G standard, the various examples described herein are applicable to other networks, where network slicing is enabled or implemented.

Before describing the details of the various examples contemplated herein, it would be beneficial to describe a network to which the aforementioned device may connect. FIG. 1 illustrates an example network 100 in which or with which various examples of the present disclosure may be implemented. A mobile network can be thought of as comprising two component networks, the radio access network (RAN) and the core network.

A mobile network's RAN may include various infrastructure, e.g., base stations/cell towers, masts, in-home/in-building infrastructure, and the like. The RAN allows users of mobile devices (also referred to as user equipment (UE), e.g., smartphones, tablet computers, laptops, vehicle-implemented communication devices (e.g., vehicles having vehicle-to-vehicle (V2V) capabilities), to connect to the core network. FIG. 1 illustrates a plurality of mobile devices using their respective RAN to connect to the core network via a 5G macro base station or macro cell, e.g., 5G macro cell 130.

Macro cells can refer to (tall, high-powered) "macro" base stations/cell towers that are able to maintain network signal strength across long/large distances. Macro cells, such as 5G macro cells, may use multiple input, multiple output (MIMO) antennas that may have various components that allow data to be sent and/or received simultaneously. In the example network 100 of FIG. 1, macro cell 130 may provide wireless broadband coverage/communications to devices, such as computer 110, vehicle 112, smartphone 114, and house 116. In some examples, a plurality of macro cells, like macro cell 130, may be used to provide broadband service to each of the different devices. Macro cells may also be used to provide broadband services to different areas, such as a city or municipality. The MIMO antennas used by macro cells may comprise large numbers of antenna elements, which can be referred to as massive MIMO, whose size may be comparable to, e.g., 3G and/or 4G base station antennas.

The core network may comprise the mobile exchange and data network used to manage the connections made to/from/via the RAN. The core network of network 100 may include a central server and a local server, not illustrated in FIG. 1. The central server may effectuate broadband service to a particular area 130 by way of a particular macro cell. The central server may also operatively connect to a local server, which in turn, provides broadband connectivity by way of other macro cells. The use of distributed servers, such as local servers, can improve response times, thereby reducing latency. The core network may leverage NF virtualization (instantiation of NFs using virtual machines via the cloud rather than hardware) and network slicing (segmentation of network 100 in accordance with a particular application, industry, or other criteria) to provide these lower response times, and provide faster connectivity.

As illustrated in FIG. 1, the core network of network 100 may be configured into multiple distinct virtual networks to allocate different resources to different types of services. Each virtual network, such as virtual networks 160, 162, 164 and 166, may be designated for a different industry to provide a particular service. Each virtual network 160, 162, 164, and 166 may be allocated with resources to fulfill specific network requirements of devices based on the industry/service sought, and each virtual network may be accessed through a different network slice, such as network slice 150, 152, 154, and 156. In one example, virtual network 160 may be tailored for entertainment video streaming and be accessed via network slice 150, virtual network 162 may be tailored for automotives and be accessed via network slice 152, virtual network 164 may be tailored for smartphones and be accessed via network slice 154, and virtual network 166 may be tailored for Internet of Things (IoT) devices and be accessed via network slice 156. Each of the devices of computer 110, vehicle 112, smartphone 114, and house 116 may be served by one or more of the network slices 150, 152, 154 and 156 to access one or more of the respective virtual networks 160, 162, 164 and 166. With the use of network slices and individual virtual networks, traffic flow may be managed between devices and resources may be allocated and better utilized to deliver tailored services to users of devices, which may ultimately provide better user experience.

As alluded to above, each device or UE, e.g., smartphone, satellite phone, etc. in a telecommunications network may be uniquely identified by its IMEI/PEI, rather than by a SIM card installed therein. This is because SIM cards are typically provided by network operators or service providers, and are easily swapped into different UEs. A typical network procedure involves checking a UE's PEI/IMEI to determine whether or not the subscriber (identified by the SIM card) is allowed to use the UE, and also to identify whether or not the UE is stolen or not.

In a typical network, the EIR may be a centralized register comprising a database of IMEIs associated with denylisted UEs. Service providers may subscribe to an EIR, and if a UE's IMEI is present in an EIR, that UE is prohibited from working on member service provider networks. Centralized EIRs can be established on a country-wide basis, or within a particular network, depending on country regulations.

Today, networks perform periodic equipment check requests against a centralized EIR to check the association between SIM cards and a UE's PEI/IMEI to stop stolen or unauthorized devices from connecting to the network. With the advent of 5G, a 5G-EIR has been introduced, and the AMF (or other NF) can request access to a 5G-EIR over an N5g-eir interface to verify UE status.

With the advent of network slicing, as noted above, service provider/network operators or network slice tenants may define policies that control which devices are able to connect to specific network slices. Some network slices may be private (non-public networks), and for security reasons, access should be limited to a defined set of devices. This can arise in the context of, e.g., industrial IoT, manufacturing, smart city use cases, and the like. In accordance with current 5G standards, the right to connect to a network slice is linked to the identification and capabilities of the device, such as the subscriber profile, and the characteristics of the subscriber. Thus, devices that are not preconfigured with access to a particular network slice would be unable to connect to the particular network slice. This ultimately limits the efficiency of network slicing and the utilization of resources by permitting devices to access virtual networks that meet the specific network requirements being sought.

In the 5G context, and in particular for private slices, device access control should be performed on each access request to prevent unauthorized access. Performing such a check upon receipt of each access request would also allow the ECS to immediately detect use of a new device, and to trigger mandatory UE configuration activities before the device is allowed to connect to the requested slice. The UE configuration activities may be performed by one or more NFs in the communications network, and one or more of the NFs, such as the AMF, may send the UE configurations to the UE to allow the UE to connect to the requested slice.

For low-latency use cases, there is also an opportunity to reduce response times by optimizing EIR-related message flows to the ECS. In this way, multiple queries to centralized databases or NFs can be avoided. In addition, a device that is not allowed to attach to a network and/or is not allowed to use/access a certain network slice(s) can be identified by the ECS as early as possible, and sync with the various NFs to determine the appropriate network slice to assign to the device.

Further still, according to the manner in which network slices are implemented in 5G, a device can request to connect to multiple network slices, e.g., up to eight network slices. Thus, device access control policies may be applied to each requested network slice, resulting in some network slices allowing access, while other network slices rejecting the requested access. At the end of the registration procedure, the AMF may return to the device, the subset of network slices that the device may use according to the network requirements in the request. Upon conclusion of the device registration procedure, the AMF can reply to the device with a list of the "allowed" network slices. However, the list of "allowed" network slices may not include a network slice that ultimately meets the network requirements needed by the device for a specific service since the list of "allowed" network slices is not generated based on the network requirements requested by the device. The list of "allowed" network slices may simply include all of the network slices that the device is preconfigured with authorization to access.

This invention discloses, as will be discussed below in greater detail, that a device may send a request for a network slice(s) to the ECS. The request may be for a network slice(s) that meets the specific network requirements that the device needs for a particular service. The ECS may determine, using other various NFs, which network slice(s) to assign to the device according to the network requirements associated with the service and type of network slice being requested. Upon determining a network slice that meets the network requirements, the ECS may sync with and orchestrate other NFs to activate the network slice, and configure new policies and profiles for the device to use the network slice. The AMF may then reply to the device with the new policies and profiles so the device may begin using the network slice for the particular service.

Figure 2:
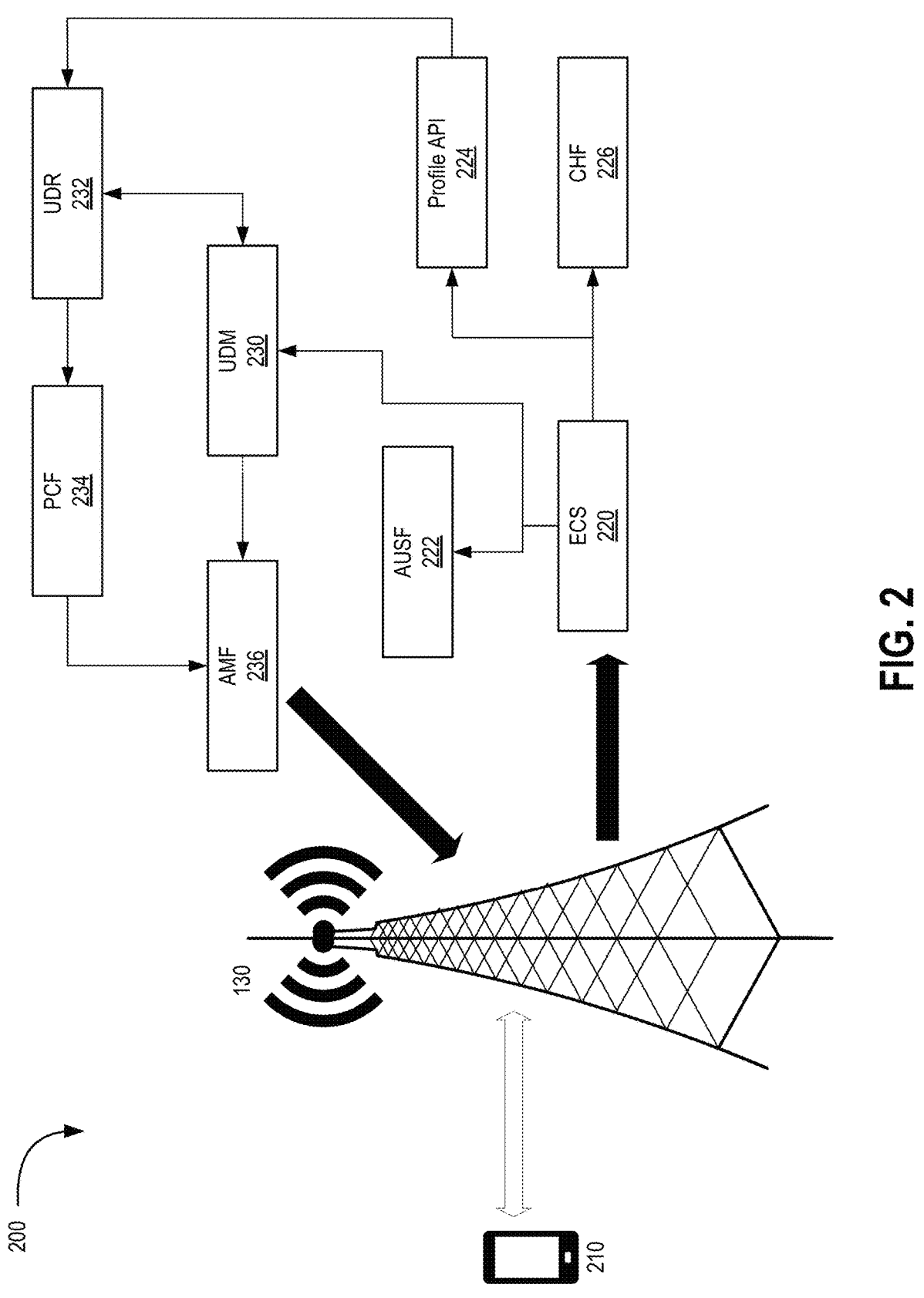
FIG. 2 illustrates a subset of conventional network functions.

FIG. 2 illustrates an example representation of certain system NFs, although not all NFs/elements are necessarily illustrated. For example, other examples of NFs that may be part of a 5G (or other appropriate) system, may include, but are not limited to, a SMF, an Unstructured Data Storage Function (UDSF), a EIR NF, Network Slice Selection Function (NSSF), etc. It should be understood that NFs in the core network may discover other NFs through the NF repository function (NRF), while structured or standard data may be stored in a Uniform Data Repository (UDR), e.g., UDR 232, which is accessible by other NFs, such as the Unified Data Management (UDM), e.g., UDM 230. As noted above, the AMF, e.g., AMF 236, may receive connection and session-related information from devices or UEs across N1/N2 reference point interfaces (between device and AMF/between RAN and AMF), but may only handle connection and mobility management tasks. That is, an AMF instance may be specified by a UE, e.g., UE 210, in a Non-Access Stratum (NAS) message that is routed to the AMF instance by the RAN. Performing the role of an access point to the 5G core network (terminating the RAN control plane and device traffic), the AMF instance may authenticate the UE and manage, e.g., handovers, for the UE between gNBs.

As illustrated in FIG. 2, the UE 210 may communicate with the ECS, e.g., ECS 220, which may act as the single entry point for the communication between the devices, such as UE 210, and a network. The UE 210 may send a message, via RAN, requesting to connect to a specific network slice in a network, such as a 5G network. The message may be sent to the ECS 220 to connect to the core network of the 5G network via a 5G macro base station, e.g., macro cell 130. Upon receiving the message from the UE 210 requesting to connect to a specific network slice, the ECS 220 may determine information associated with the UE 210 and the request. The information associated with the UE 210 may include identification information, service identification, requirements of network specifications, etc. The ECS may use the information associated with the UE 210 and the request to determine an applicable network slice to assign to the device that may meet the needs of the device. For example, the request to connect to a specific network slice may include particular requirements of network specifications that the device needs the specific network slice to have. The network specifications may include capabilities of a network slice that the device needs to perform a particular function or service. The capabilities may include a particular degree of speed, latency, bandwidth, reliability, etc., that a network slice must have to meet the needs of the device.

Using the information associated with the UE 210 and the request, the ECS 220 may sync with and orchestrate other NFs in the network, such as Authentication Server Function (AUSF) 222, Profile Application Programming Interface (API) 224, Charging Function (CHF) 226 and UDM 230, to determine and assign a network slice to the UE 210. As also illustrated in FIG. 2, the Profile API 224 may interface with the UDR 232, the UDR 232 may interface with the UDM 230 and the PCF 234, and UDM 230 and PCF 234 may interface with AMF 236. As noted above, not all NFs/ elements and interfaces between NFs are necessarily illustrated in FIG. 2.

The AUSF 222 may handle authentication requests for 3GPP access and non-3GPP access with a UE. AUSF 222 may be a termination point of user plane security while also providing any authentication/authorization services, in additional to slice security and IMSI/SUPI privacy. The AUSF 222 may determine the authentication of the UE 210 and compute authentication data and keys. Accordingly, AUSF 222 may interact with the ECS 220 to authenticate the UE 210 and network slice that the UE 210 is requesting to connect to.

AUSF 222 may also interact with UDM 230, which may be used to manage data for access authorization, user registration, data network policies and subscription data relevant to a consumer NF. The subscription data may be provided to a session management function (SMF), which allocates IP addresses and manages user sessions on the network. Consumer NFs may also use UDM 230 to subscribe/un-subscribe from data change notifications. For example, UDM 230 allows AMF 236 (one example of a consumer NF) to get notified when UDM 230 modifies subscription data.

The UDM 230 may be paired with the UDR 232, which is a centralized data storage NF that consolidates and stores data collected from various other NFs, such as the UDM 230. Such data in the UDR 232 may include user data such as customer profile information, customer authentication information and encryption keys for the customer information. The UDR 232 data may also include access authorization data, network policies data, application data and subscription data. Various other NFs, such as UDM 230, Profile API 224, and PCF 234, may retrieve data from the UDR 232 to perform various functions.

The Profile API 224 may be used to create a new communications plan for the UE 210 after validating that the UE 210 has been authenticated to use the requested network slice. The new communications plan may include new access policies and network slice profile for the connection between the UE 210 and requested network slice to allow the UE 210 to connect to and use the requested network slice.

The CHF 226 may provide account balance management function, rating function, and charging gateway function. The CHF 226 may also interact with PCF 234 to monitor subscriber usage consumption and policy counters, and provide policy and charging control during service delivery. Together with PCF 234, the CHF 226 may allow operators to manage and control subscriber spending as well as usage control. The CHF 226 may also store the policy counter information against the subscriber pricing plan and notify the PCF 234 when the subscriber breaches the policy thresholds based on the usage consumption of the subscriber.

The PCF 234 may govern the control plane functions via policy rules defined and user plan functions via policy enforcements to manage and govern network behavior. The PCF 234 may use the UDR 232 to store and retrieve policy related data to manage network services. The PCF 234 may use the policy related data to define policies for different network slices, such as the requested network slice. The PCF 234 may also work closely with the CHF 226 for usage monitoring, as discussed above.

The AMF 236 is a control plan function in a 5G network. The AMF 236 may perform operations such as mobility management, registration management, connection management, and reachability management. Mobility management may involve maintaining information of a UE's location within the network. The UE, such as UE 210, is required to complete periodic registration updates after it has completed initial registration. The periodic updates may act as indicators to verify that the UE remains on the system and has not moved out of coverage or has become unavailable in the network, e.g., the UE stopped working or is deactivated. A UE may also complete updates due to mobility, where these mobility updates trigger when the UE moves outside the current registration area and thus is outside of the tracking area(s) which the UE is currently registered to.

Registration management may include allowing a UE, such as UE 210, to register and de-register with the 5G network. A UE must complete registration procedures to receive authentication to use 5G services. Registration creates a UE context within the 5G network. Connection management may include establishing and releasing the control plane signaling connections between the UE, such as UE 210, and the AMF, such as AMF 236. Reachability management may include ensuring that a UE, such as UE 210, is reachable, e.g., it is possible to send messages to the UE to establish a mobile terminated connection. Messaging the UE when it is in CM-Idle state may trigger the UE to initiate the NAS Service request procedure and subsequently establish an N1 signaling connection before moving into the CM-Connected state.

In some examples, the functionality of a typical AMF, such as AMF 236, can be expanded to include slice access authorization, where the AMF, in addition to checking on SUPI/PEI status, can apply access control policies for the slices available to a device in the 5G network. Information regarding the available slices can be compared to information regarding slices for which the UE seeks access and the slices for which the UE is allowed to access based on its subscriber information. Thus, in some examples, an enhanced AMF 236 may provide a mechanism for allowing/ disallowing a UE, such as UE 210, access (based on its PEI) to a particular slice. In addition, based on the network slice/service requested by a consumer/UE, AMF 236 may select the respective SMF for managing the user session context. Moreover, in some examples, the aforementioned centralized EIR typically implemented in a network, e.g., centralized 5G-EIR, can be localized with the enhanced AMF. In this way, a local version/instance of and EIR database can be maintained, and the amount of messaging to the centralized 5G-EIR (across the network) can be reduced.

The system architecture 200 may also include an Unstructured Data Storage Function (UDSF) for storing dynamic state data. It should be understood that NFs may be "stateless." That is, a stateful network element stores certain user/connection/association data, e.g., a context." If such a stateful network element fails, the connection fails. Connectionless network elements, however, need not locally store any related data, and a different network element with the requisite capabilities may be used instead, so that the connection/association can be guaranteed. Thus, UDSF allows any NF to store/retrieve its unstructured data into/from UDSF, e.g., UE contexts. Typically, UDSF belongs to the same public land mobile network where the NF is located.

As alluded to above, network slicing has been introduced as a new capability in 5G networks. Network Slice Selection Function (NSSF) may maintain a list of network slice instances defined by an operator/tenant/etc., including slice definitions, e.g., required resources. As described herein, a UE, such as UE 210, may be configured with a list a network slices to which it is subscribed, and during registration, the UE can request those subscribed network slices. In conventional 5G networks, AMF 236 (in conjunction with NSSF) can authorize the use of a network slice(s) using subscription information (based on SUPI/IMSI) from UDM 230. In this way, AMF 236 may authorize the UE 210 to use a specific network slice that the UE 210 requests to connect.

FIG. 3 illustrates an example message flow diagram reflecting operations performed to effectuate on demand network slicing in accordance with one example.

In step 302, a device, e.g., UE 210 in FIG. 2, may be configured with initial NSSAI and User Equipment Route Selection Policy (URSP) rules. The NSSAI is a collection of Single Network Slice Selection Assistance Information (S-NSSAIs). Currently, 3GPP allows up to eight (8) S-NS-SAIs in the NSSAI sent in signaling messages between the UE, such as UE 210, and a network, such as a 5G Network. This means a single UE has the capability to be served by at most 8 network slices at a time. The URSP rules may be used by the UE as a way to manage network slice information for the UE.

In step 304, t the device, e.g., UE 210 in FIG. 2, may not be connected to a network slice that meets the demands of a service that the user intends to execute. The UE 210 may include a list of network slices that the UE 210 may connect to and use. The list of network slices may include the network specifications of each network slice. Based on a service requested by the user of the UE 210, the network slices that the UE 210 currently has access to may not have the necessary network specifications required for the particular service being requested. The UE 210 may then access and connect to a network slice that has the network specifications to allow the user of the UE 210 to perform a particular service.

In step 306, the device, e.g., UE 210 in FIG. 2, may connect to the ECS, e.g., ECS 220 in FIG. 2, in a network. The UE 210 may send a request to the ECS 220 to connect to a network slice that has network specifications that meet the demands of the service that the user seeks to execute. Upon receiving the request, the ECS 220 may interact with an AUSF, e.g., AUSF 222 in FIG. 2, which may be used to authenticate that the device, e.g., UE 210 in FIG. 2, has a new plan that provides the UE 210 to access and connect to the requested network slice. AUSF 222 may be a termination point of user plane security while also providing any authentication/authorization services, in addition to slice security and IMSI/SUPI privacy. Upon authentication of the new plan, the AUSF 222 may notify the ECS, e.g., ECS 220 in FIG. 2, with a message of the authentication. After authenticating that the UE 210 may access and connect to the requested network slice, the ECS 220 may determine if the device, according to the characteristics, profile, and capabilities of the device, is validated to make such a request by checking the identification information and capabilities of the device. The ECS 220 may interact with an AUSF, e.g., AUSF 222 in FIG. 2, to determine the authentication of the UE 210 based on the identification information of the UE 210.

In step 308, after it has been determined that the device, e.g., UE 210 in FIG. 2, is validated to make a request for a specific network slice, the ECS may redirect the device to a Websheet. The Websheet may allow the device to obtain a new plan upon validation that the device is eligible to make the request.

In step 310, the device may be redirected to a Websheet for the device, e.g., UE 210 in FIG. 2, to obtain a new plan. The Websheet may include a list of available plans that the device may obtain. Obtaining a new plan may provide the UE 210 with the subscription data to request for the specific network slice. In some examples, obtaining a new plan may include having the user of the device purchase a new subscription plan to obtain the necessary subscription data to request for the specific network slice. The new plan may allow the device to be assigned to and connect with the specific network slice requested, where the specific network slice has the network specifications need for the device to perform a particular service.

In step 312, the ECS may trigger service orchestration. As described previously in step 306, the AUSF 222 may authenticate that the device has a new plan that provides the UE 210 to access and connect to the requested network slice. Upon such authentication, the ECS 220 may proceed with orchestrating with other various NFs to assign the specific network slice to the UE 210.

In step 314, the ECS, e.g., ECS 220 in FIG. 2, may trigger the request sent from the device, e.g., UE 210 in FIG. 2, for a specific network slice to other NFs, such as the UDM, Profile API, and CHF NFs in the network. The UDM, e.g., UDM 230 in FIG. 2, may be used to manage data for access authorization, user registration, data network policies and subscription data relevant to another NF, such as AMF 236. The UDM 230 may receive and manage the authentication data, registration data, network policies data and subscription data associated with the UE 210 to support the access and connect of the UE 210 to the specific network slice.

The Profile API, e.g., Profile API 224 in FIG. 2, may be triggered by the ECS 220 to create a new communication plan for the UE 210. The new communication plan for the UE 210 may include new access policies and network slice profile needed to provide the UE 210 with the ability to access and connect to the requested specific network slice. The CHF, e.g., CHF 226 in FIG. 2, may be triggered by the ECS 220 to monitor the subscriber usage consumption of the UE 210. The CHF 226 may also monitor the subscription data associated with the UE 210, including the subscription data of the new plan obtained by the UE 210 via the Websheet, to determine if the UE 210 breaches any policy thresholds based on the usage consumption of the UE 210. The CHF 226 may notify other 5G NFs, such as the PCF, e.g., PCF 234 in FIG. 2, when any policy thresholds are breached.

In step 316, new access policies and network slice profile from the new communication plan created by the Profile API 224 may be propagated to the UDR, e.g., UDR 232. The authentication data, registration data, network policies data and subscription data managed by the UDM 230 may also be propagated to the UDR 232. The UDR 232 may consolidate and store the data and information that other NFs, such as the Profile API 224 and UDM 230, acquire and use to perform their respective functions. In some examples, the UDR 232 may act as a centralized data storage NF of all of the data and information within the 5G network and allow the other NFs to retrieve the data necessary for the NF to perform its respective function.

In step 318, the UDR, e.g., UDR 232 in FIG. 2, may determine any changes in data associated with one or more UEs, such as UE 210, and network slices in the 5G network, and propagate any changes to the PCF, e.g., PCF 234, and the AMF, e.g., AMF 236. The PCF 234 may use the policy data to define policies for different network slices, such as the requested network slice, in response to any changes that have been determined by the UDR 232. The AMF 236 may perform operations, including registration and connection management, and provide the UE 210 with the new policies and profiles to access and use the requested network slice.

In step 320, the device, e.g., UE 210 in FIG. 2, may receive the new policies and profiles from the AMF 236. The UE 210 may be updated with the new policies and profiles to have access to and begin using the requested network slice. Once updated with the new policies and profiles, the UE 210 may use the requested network slice to perform the services for which the requested network slice was desired.

FIG. 4 is an example computing component 400 that may be used to implement various features of ECS or ECS instance or similar element(s)/components in accordance with one example of the disclosed technology. Computing component 400 may be, for example, a server computer, a controller, or any other similar computing component capable of processing data. In the example implementation of FIG. 4, the computing component 400 includes a hardware processor 402, and machine-readable storage medium 404.

Hardware processor 402 may be one or more central processing units (CPUs), semiconductor-based micropro-cessors, and/or other hardware devices suitable for retrieval and execution of instructions stored in machine-readable storage medium 404. Hardware processor 402 may fetch, decode, and execute instructions, such as instructions 406-412, to control processes or operations for determining UE slice accessibility. As an alternative or in addition to retriev-ing and executing instructions, hardware processor 402 may include one or more electronic circuits that include elec-tronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, mag-netic, optical, or other physical storage device that contains or stores executable instructions. Thus, machine-readable storage medium 404 may be, for example, Random Access Memory (RAM), non-volatile RAM (NVRAM), an Electri-cally Erasable Programmable Read-Only Memory (EE-PROM), a storage device, an optical disc, and the like. In some examples, machine-readable storage medium 404 may be a non-transitory storage medium, where the term "non-transitory" does not encompass transitory propagating sig-nals. As described in detail below, machine-readable storage medium 404 may be encoded with executable instructions, for example, instructions 406-412.

Hardware processor 402 may execute instruction 406 to receive, from a device, a request to connect to a network slice in a communications network, such as a 5G network, for example. As noted above, in accordance with some examples, an ECS or similarly configured NF can receive a request, from a device, to connect to a network device in a communications network. The ECS may be used for real-time communications between a device and the communi-cations network. The ECS may receive one or more requests from a plurality of devices in the communications network. The ECS may interact and communicate with one or more other components in the communications network, such as NFs, to process the request to connect to a network slice. The one or more NFs in the communications network may include an Authentication Server Function (ASF), a Unified Data Management (UDM), a Profile Application Program-ming Interface (API), a Charging Function (CHF), a Uni-form Data Repository (UDR), a Policy Control Function (PCF) or an Access and Mobility Management Function (AMF). In some examples, the device the request is sent from may be a UE, such as a smartphone, tablet, computer, laptop, server, or vehicle-implemented communication device that has the capabilities to connect to the communi-cations network.

In some examples, prior to receiving a request from the device, it may be determined whether the device is validated to make a request to connect to a specific network slice. A device may be validated if the profile or identification of the device is determined to be on an on-demand list. The on-demand list may include a list of the various devices that are able to request to connect to specific network slices. In some examples, a device may be on the on-demand list once the device has been registered with a request function. In some examples, a device may be registered after a fee has been paid for the request function.

Hardware processor 402 may execute instruction 408 to obtain, from the request, network specifications associated with the requirements of the network slice being requested by the device. The request obtained from the device may include network specifications of the network slice that the device seeks to connect to. The network specifications of the network slice may be requirements in which the capabilities of the network slice need to meet to fulfill the demands of the device. In some examples, the network specifications may include at least one of a speed threshold, latency threshold, bandwidth threshold, and reliability threshold. The requested network slice may need to have capabilities that meet at least one of the network specifications to be qualified to fulfill the request of the device.

Hardware processor 402 may execute instruction 410 to determine, based on the network specifications of the requested network slice, a first network slice in the commu-nications network for the device to connect to. The first network slice may be determined to be a network slice that meets the request of the device. The first network slice may meet at least one of the network specifications requested by the device for a network slice to connect to. In some examples, the first network slice may be a standardized slice type. In some examples, the first network slice may a carrier-specific slice type.

A communications network may include a plurality of network slices, and one or more of the plurality of network slices may meet the network specifications requested by the device for a network slice. In some examples, determining the first network slice for the device to connect to may include identifying the network slice of the plurality of network slices in the communications network that has capabilities that best meets the network specifications asso-ciated with the request sent by the device. In one example, best meeting the network specifications associated with the request may include connecting to a network slice that has capabilities to meet all or most of the network specifications. For example, if the network specifications has a speed threshold, latency threshold, bandwidth threshold, and a reliability threshold, the first network slice may have capa-bilities that exceed all four thresholds, while other network slices may only have capabilities that exceed one, two or three of the thresholds. In another example, best meeting the network specifications may include a network slice that has the highest degree of capabilities in comparison to the capabilities of the other network slices amongst the plurality of network slices. For example, if the network specifications has a speed threshold, latency threshold, bandwidth thresh-old, and a reliability threshold, the first network slice may have capabilities that not only exceed each of the thresholds, but that has the highest degree of speed, latency, bandwidth and reliability when compared to the capabilities of other network slices in the plurality of network slices.

Once the first network slice has been identified, it may be determined whether the first network slice is available for the device to connect to. In some examples, availability of the first network slice may include determining if it has available resources for the device to use. In another example, availability of the first network slice may include determining if the device has the capabilities to use the first network slice. In another example, availability of the first network slice may include whether the device is authorized to use the first network slice. In some examples, determining whether the device is authorized to use the first network slice may depend on the type of network slice the first network slice is. For example, if the first network slice is a carrier-specific network slice type, then the device may be authorized, and have the capability to connect to and use the first network slice if the device is able to use the same carrier as the first network slice. The device may use the same carrier as the first network slice if the device is a subscriber of the same carrier. The device may also use the same carrier as the first network slice if the device is able to request and receive access to use the same carrier. Requesting and receiving access to use the same carrier as the first network slice may include additional cost incurred by the user of the device to become a subscriber to the same carrier as the first network slice.

In some examples, determining the first network slice for the device to connect to may include identifying the network slices of the plurality of network slices in the communications network that meet at least one of the network specifications associated with the request sent by the device. It may also be determined to which of the identified network slices are available for the device to connect, and that to which the device has the capability to connect After determining which network slices of the plurality of network slices are qualified by being available for the device to use, capable for the device to connect to, and meeting the network specifications associated with the request sent by the device, a list of the qualified network slices may be sent to the device. The device may choose which network slice from the list of qualified network slices to which it wants to connect. A message may be received from the device where the message comprises a selection of the first network slice from the list of qualified network slices to which the device is choosing to connect. In another example, after determining which network slices of the plurality of network slices are qualified by being available for the device to use, capable for the device to connect to, and meeting the network specifications associated with the request sent by the device, the network slice that best exceeds the network specifications may be selected for the device to connect to.

Hardware processor 402 may execute instruction 412 to assign the first network slice to the device. Assigning the first network slice to the device may include activating the first network slice in the communications network. Activating the first network slice may include generating configurations of the first network slice, which may include configuring the Internet Protocol (IP) address and enabling the Interior Gateway Protocol (IGP) of the first network slice. The IP address of the first network slice may be used to identify the first network slice and the IGP may be the routing protocol that is used to exchange routing information within the communications network. Assigning the first network slice may also include creating a communications network plan for the connection between the first network slice and the device. In some examples, the communications network plan may include the access policies of the first network slice. The access policies may include a list of devices allowed to connect to the first network slice and the list of allowed devices may include the identification information of the device. After the first network slice has been activated and the communications network plan for the connection between the first network slice and the device has been created, the device may be sent the configurations of the first network slice. The device may incorporate the received configurations of the first network slice to allow the device to connect to the first network slice.

Figure 5:
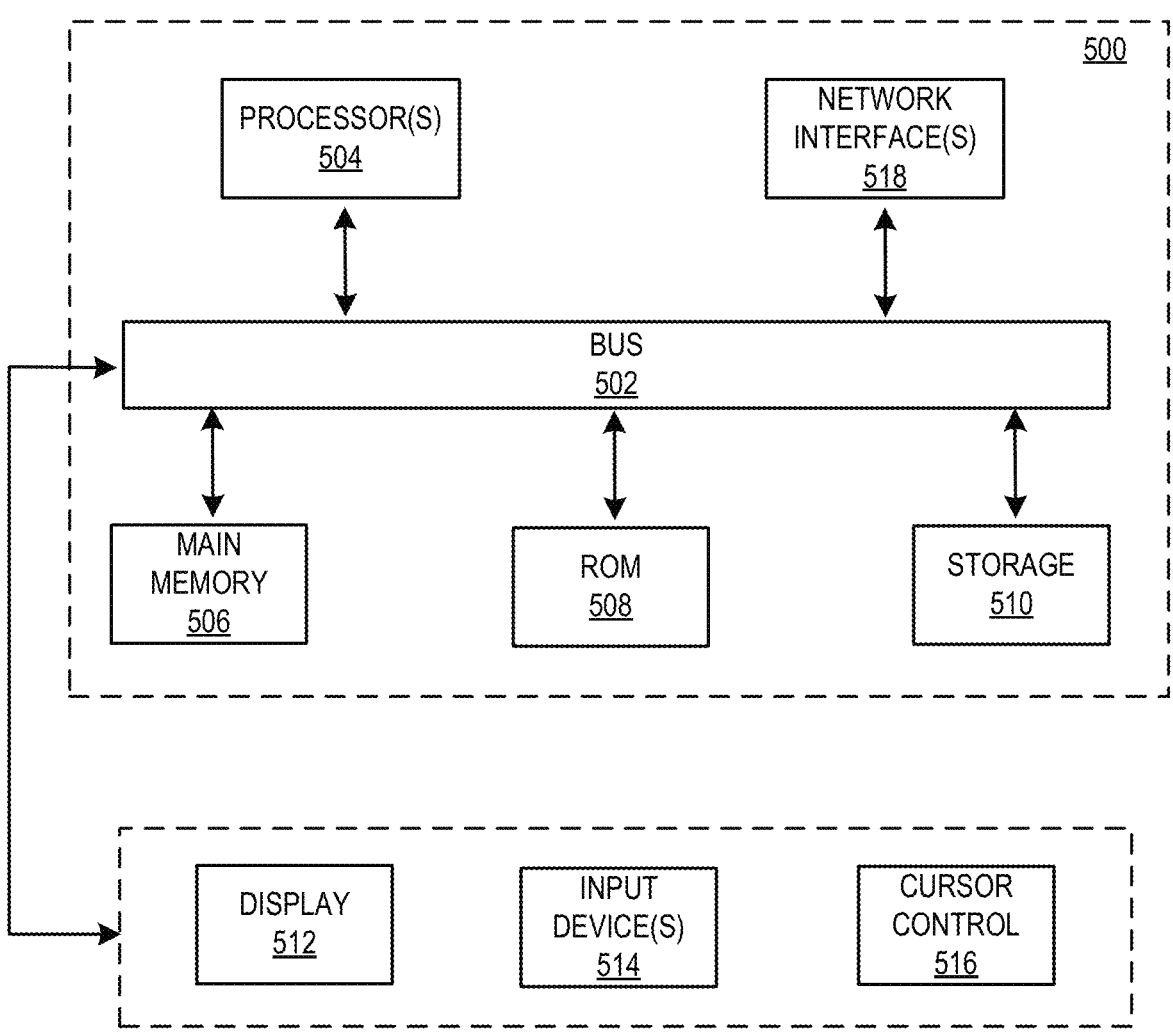
FIG. 5 is an example computing component that may be used to implement various features of examples of the present disclosure.

FIG. 5 depicts a block diagram of an example computer system 500 in which various of the examples described herein may be implemented. For example, the functionality of one or more of the elements, NFs, etc. illustrated in any of FIGS. 1-4 may be implemented or effectuated by computer system 500. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. Also coupled to bus 502 are a display 512 for displaying various information, data, media, etc., input device 514 for allowing a user of computer system 500 to control, manipulate, and/or interact with computer system 500. One manner of interaction may be through a cursor control 616, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one example, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing system for on demand network slicing comprising:
    an Entitlement Configuration Server (ECS) communicating with one or more Network Functions (NFs);
    one or more processors; and
    a non-transitory computer readable medium including instructions that, when executed by the one or more processors, cause the one or more processors to:
        receive, by the ECS from a device, a request to connect to a network slice in a communications network;
        obtain, by the ECS from the request, network specifications associated with the network slice being requested;
        obtain, by the ECS from the one or more NFs, one or more network slices of a plurality of network slices in the communications network based on the network specifications;
        determine, by the ECS, a first network slice of the one or more network slices for the device to connect to; and
        send, by the ECS to the one or more NFs, the first network slice for the one or more NFs to assign the first network slice to the device.

2. The computing system of claim 1, wherein the ECS is used for real-time communication between the device and the communications network.

3. The computing system of claim 1, wherein the one or more NFs may include an Authentication Server Function (ASF), a Unified Data Management (UDM), a Profile Application Programming Interface (API), a Charging Function (CHF), a Uniform Data Repository (UDR), a Policy Control Function (PCF) or an Access and Mobility Management Function (AMF).

4. The computing system of claim 1, wherein the network specifications comprises at least one of a speed threshold, latency threshold, bandwidth threshold or reliability threshold to meet requirements of the requested network slice.

5. The computing system of claim 1, wherein identifying each of the one or more network slices of the plurality of network slices comprises:
    determining a second network slice has available resources for the device to use;
    determining the device has a connection capability to use the second network slice; and
    determining the second network slice has network capability that meets the network specifications.

6. The computing system of claim 1, wherein determining the first network slice of the one or more network slices comprises:
    determining the first network slice comprises a first network capability that best meets the network specifications.

7. The computing system of claim 1, wherein determining the first network slice of the one or more network slices comprises:
    sending, by the ECS to the device, a list of the one or more network slices; and
    receiving, by the ECS from the device, a selection to connect to the first network slice from the one or more network slices, wherein the selection comprises validation that the device is authorized to use the first network slice.

8. The computing system of claim 1, wherein the first network slice is a standardized slice type or a carrier-specific slice type.

9. The computing system of claim 1, wherein the computer readable medium further comprises instructions to, prior to receiving the request:

determine the device is validated to request to connect to a particular network slice by verifying a first profile of the device is on an on-demand list.

10. A network apparatus, comprising:

an Entitlement Configuration Server (ECS);

a processor; and a memory unit operatively connected to the processor and including computer code that when executed, causes the processor to:

receive, from a device, a request to connect to a network slice in a communications network;

obtain, from the request, network specifications associated with requirements of the network slice being requested;

obtain, from one or more NFs, one or more network slices of a plurality of network slices in the communications network based on the network specifications;

determine a first network slice of the one or more network slices for the device to connect to by:

sending to the device, a list of the one or more network slices; and receiving from the device, a selection to connect to the first network slice from the one or more network slices, wherein the selection comprises validation that the device is authorized to use the first network slice; and sending to the one or more NFs, the selection of the first network slice to assign the first network slice to the device.

11. The apparatus of claim 10, wherein the ECS is used for real-time communication between the device and the communications network.

12. The apparatus of claim 10, wherein the network specifications comprises at least one of a speed threshold, latency threshold, bandwidth threshold or reliability threshold to meet requirements of the requested network slice.

13. The apparatus of claim 10, wherein each of the one or more network slices of the plurality of network slices comprises:

available resources for the device to use;

a connection capability to use a second network slice; and a network capability that meets the network specifications.

14. The apparatus of claim 10, wherein the list of the one or more network slices is in an order according to each of the one or more network slice's capabilities.

15. The apparatus of claim 10, wherein the one or more network slices are ordered on the list based on each network slice's capabilities.

16. The apparatus of claim 10, wherein sending the list of the one or more network slices comprises:

sending to the device, a link to a Websheet comprising the list of the one or more network slices, wherein each of the one or more network slices is available for purchase by the device.

17. The apparatus of claim 10, further including computer code that when executed, causes the processor to, prior to receiving the request:

determine the device is validated to request to connect to a particular network slice by verifying a first profile of the device is on an on-demand list.

18. A method for on-demand network slicing, comprising:

determining a request to connect to a network slice in a communications network is received from a device, wherein the request comprises network specifications associated with requirements of the network slice being requested;

identifying, based on the network specifications, one or more network slices of a plurality of network slices in the communications network, wherein the one or more network slices are available for purchase by the device;

sending, to an Entitlement Configuration Server (ECS), a list of the one or more network slices for the device to select a first network slice of the one or more network slices to purchase;

receiving the first network slice and confirmation that the first network slice was purchased by the device; and assigning the first network slice to the device.

19. The method of claim 18, wherein the assigning of the first network slice to the device, comprises:

activating the first network slice in the communications network by generating first network slice configurations;

creating a communications network plan for a connection between the first network slice and the device; and sending, to the device, first network slice configurations for the device to incorporate to allow the device to connect to the first network slice.

20. The method of claim 19, wherein the communications network plan for the connection between the first network slice and the device comprises new first network slice access policies comprising a list of devices allowed to connect to the first network slice, wherein the list of devices comprises the device.

\* \* \* \* \*